United States Patent [19]
Walters

[11] 3,962,822
[45] June 15, 1976

[54] PLANTING CONTAINERS

[75] Inventor: John Walters, Whonnock, Canada

[73] Assignee: Canadian Patents and Development Limited, Ottawa, Canada

[22] Filed: Mar. 31, 1975

[21] Appl. No.: 563,854

[30] Foreign Application Priority Data
Apr. 8, 1974  Canada .................. 196996

[52] U.S. Cl. .................. 47/34.11; 47/34.13; 47/37; 47/58
[51] Int. Cl.² .................. A01G 23/00
[58] Field of Search .................. 47/34–38.1, 47/1, 48.5, 58, DIG. 4; 71/64; 206/243; 111/2, 4, DIG. 1; 220/23.4–23.6

[56] References Cited
UNITED STATES PATENTS

| | | | |
|---|---|---|---|
| 532,687 | 1/1895 | Mulhaupt | 47/37 |
| 837,977 | 12/1906 | Thornton | 47/37.7 |
| 1,774,019 | 8/1930 | Lam | 47/37 |
| 1,936,988 | 11/1933 | Otwell | 47/37 |
| 2,435,539 | 2/1948 | Gould | 47/38 |
| 3,103,278 | 9/1963 | Kuzma et al. | 220/23.6 |
| 3,755,962 | 9/1973 | Walters et al. | 47/34 R |
| 3,800,974 | 4/1974 | Mogel et al. | 220/234 |
| 3,844,987 | 10/1974 | Clendinning et al. | 47/37 |

FOREIGN PATENTS OR APPLICATIONS

| | | | |
|---|---|---|---|
| 24,354 | 10/1897 | United Kingdom | 47/37 |

Primary Examiner—Edgar S. Burr
Assistant Examiner—James R. Feyrer
Attorney, Agent, or Firm—Ronald G. Bitner

[57] ABSTRACT

This invention relates to planting containers which facilitate the mechanized planting of seedlings in large numbers. The containers comprise a square cross-sectioned tubular portion and an earth penetrating nose portion. For immediate root egress the containers have apertures which are offset to one side in order that they are blocked by the wall of another similar container when placed contiguous therewith. The containers are adapted to be grouped into bundles which facilitate the nursery, transporting and planting operations. The containers may be formed of a biodegradable material or may comprise separating sections to allow unimpeded root development.

13 Claims, 9 Drawing Figures

PLANTING CONTAINERS

BACKGROUND OF THE INVENTION

This invention relates to planting containers, and particularly to planting containers which facilitate the mechanized planting of seedlings.

Various types of containers have been used or proposed to facilitate planting of seedlings, and these may be considered to be one of two types, those from which the seedling is removed from the container for planting, and those wherein the container is planted with the seedling. Those of the former type have the disadvantage that the planting operation is relatively complex and necessitates return for reuse, or disposal of the containers. Of the latter type there are containers formed of peat which decompose when planted in soil, but this type is not suitable for mechanized planting due to lack of rigidity.

A planting container adapted for mechanical planting is described in Applicant's Canadian Pat. No. 694,803. The container is formed of thermoplastic material and has a circular cross-section with a longitudinal slit to allow egress of the roots and subsequent breakup of the container with further growth of the plant. These containers, however, are not convenient for handling in large numbers, nor are they entirely satisfactory in allowing free egress and growth of the roots.

SUMMARY OF THE INVENTION

One object of the present invention is to provide a planting container which can be inserted into the soil by mechanical means.

Another object is to provide a container that does not impede the growth of the roots when planted.

Another object is to provide a container which facilitates grouping with other identical containers for ease of handling.

Another object is to provide containers which can be grouped and separably united into a bundle with relatively simple means.

Another object is to provide containers which can be conveniently filled with a growing medium while grouped in a bundle.

Another object is to provide a container shaped to facilitate efficient use of nursery space.

Another object is to provide a container, which when containing a seedling, can be placed contiguous with a similar container without the roots of one container penetrating another.

Another object is to provide that a bundle of containers each will have a plant at substantially the same stage of development.

Another object is to provide a container particularly suited for planting tree seedlings in large numbers.

In accordance with the invention a planting container is provided which comprises a tubular portion having a square shaped outer cross-section defining four walls, and an earth penetrating nose portion. At least two walls of the tubular portion have a plurality of apertures to allow root egress. The apertures are offset to one side of the longitudinal center of the wall such that the apertures of one container are blocked by the wall of a similar second container which is placed contiguous thereto. The nose portion of the container defines the bottom of the container which is shaped to direct the tap root downwardly and outwardly through the lowest aperture in the wall.

In preferred embodiments of the invention at least one wall also has two locating lugs which are offset to the side opposite that of the apertures and adapted to mate with apertures of another similar container which is contiguous therewith.

To allow unimpeded growth of the roots after planting the container may be formed of a biodegradable material or alternatively may be made up of separating sections.

In accordance with another aspect of the invention which provides that each container in a previously seeded bundle includes a seedling at substantially the same stage of growth, a number of relatively small containers are seeded at substantially the same time so that after a period of time one of the small containers can be planted into any container of the bundle that does not contain a seedling.

DESCRIPTION OF PREFERRED EMBODIMENTS

Figure 1:
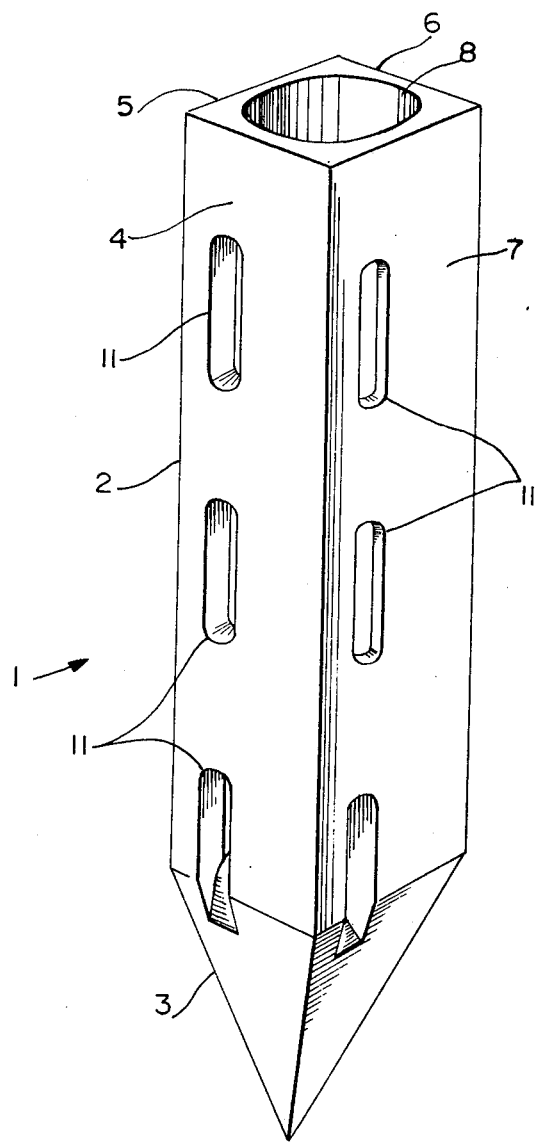
FIG. 1 is a perspective view of one embodiment of the planting container.

Referring to FIG. 1, the container 1 comprises a tubular portion 2 and a nose portion 3. The tubular portion has an outer square shaped cross-section defining four walls 4, 5, 6 and 7.

Figure 9:
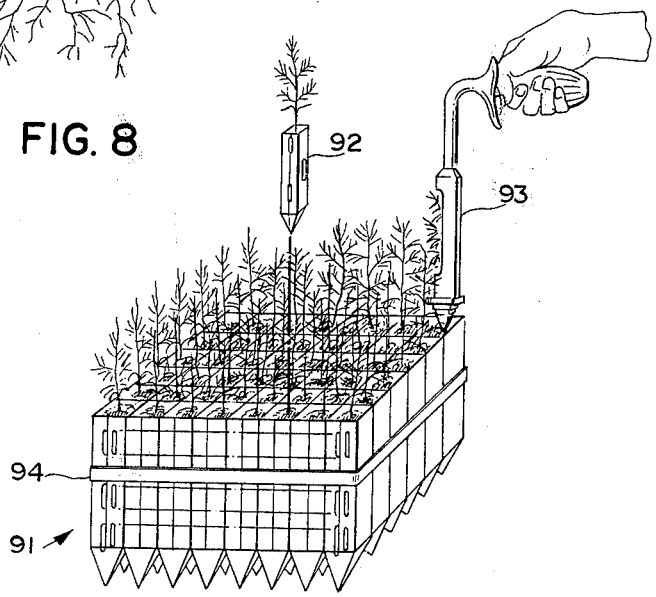
FIG. 9 illustrates means by which a bundle of previously seeded containers can be provided with a seedling in every container at substantially the same stage of development.

To allow immediate egress of the roots after planting the walls have a plurality of longitudinally spaced apertures 11 which are offset to one side of the longitudinal center of the wall such that the apertures of the container are blocked by the wall of a similar container which is placed contiguous thereto when a plurality of such containers are grouped into bundles as is shown in FIG. 9.

Figure 2:
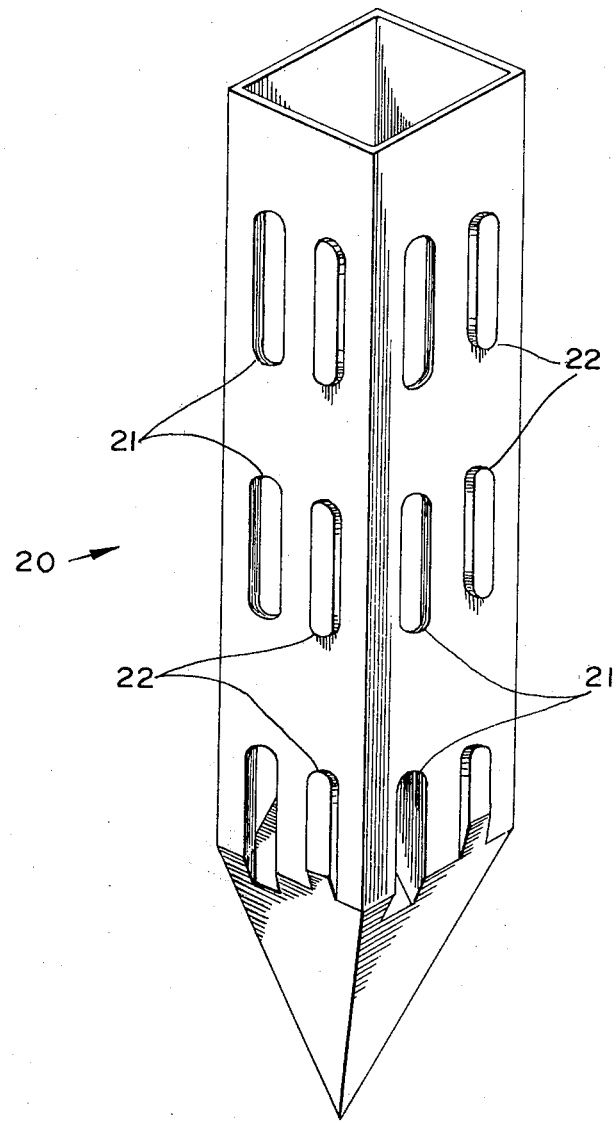
FIGS. 2 to 5 are perspective views of alternate embodiments of the invention.

The container 20 of FIG. 2 further comprises a plurality of longitudinally spaced locating lugs 22. The lugs 22 are offset to the side of the longitudinal center of the wall opposite that of the apertures 21, such that when the walls of similar containers are placed contiguous to one another to form a bundle, the lugs of one container will mate with the apertures of the other preventing the containers from sliding relative to one another. The interlocking provided by the lugs and apertures facilitates formation of a bundle simply by means of a strap or band 94 as shown in FIG. 9, thereby obviating additional supporting or containing means for handling.

The containers of FIGS. 1 and 2 are adapted to be formed of a biodegradable material. The apertures allow for immediate egress of the roots when planted. The container is designed to degrade before the developing roots are impeded by the body of the container.

The container of FIG. 1 is preferably formed of a biodegradable material such as wood whose natural roughness facilitates formation of bundles without lugs.

Although such wooded containers may be manufactured in one piece, it may be more economical to manufacture them in halves which may then be stapled together.

Figure 3:
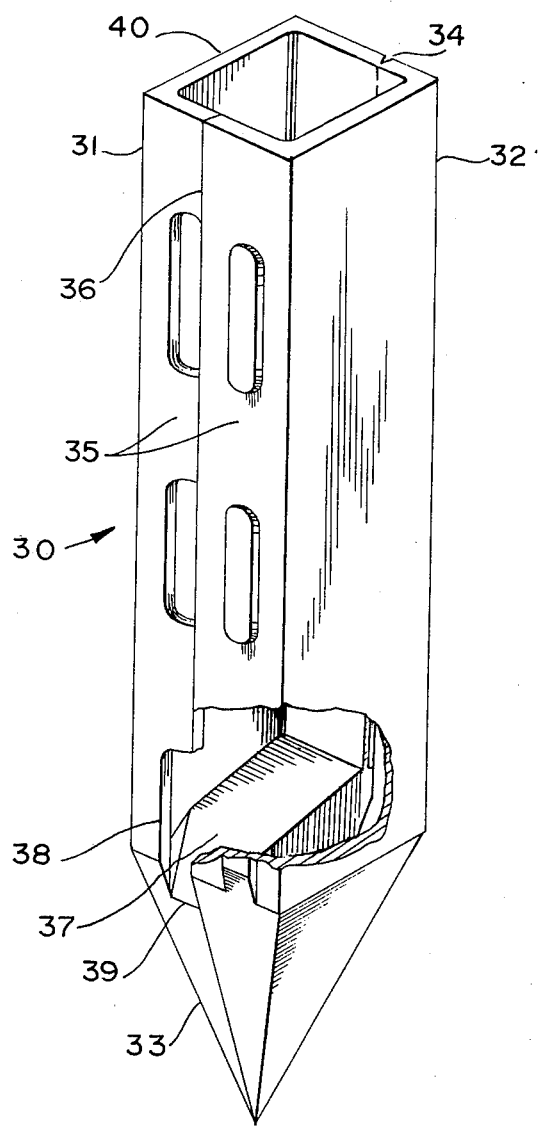

The container of FIG. 3 need not necessarily be formed of biodegradable material. The container 30 comprises two separating sections 31 and 32, defined by a slot 36 along one wall 35 and a groove 34 along the opposite wall. As the roots develop, the slot 36 allows wall 35 to open with the groove 34 acting as a hinge. Since the groove is weaker than the adjoining wall the container will eventually break into two separate sections 31 and 32.

Figure 4:
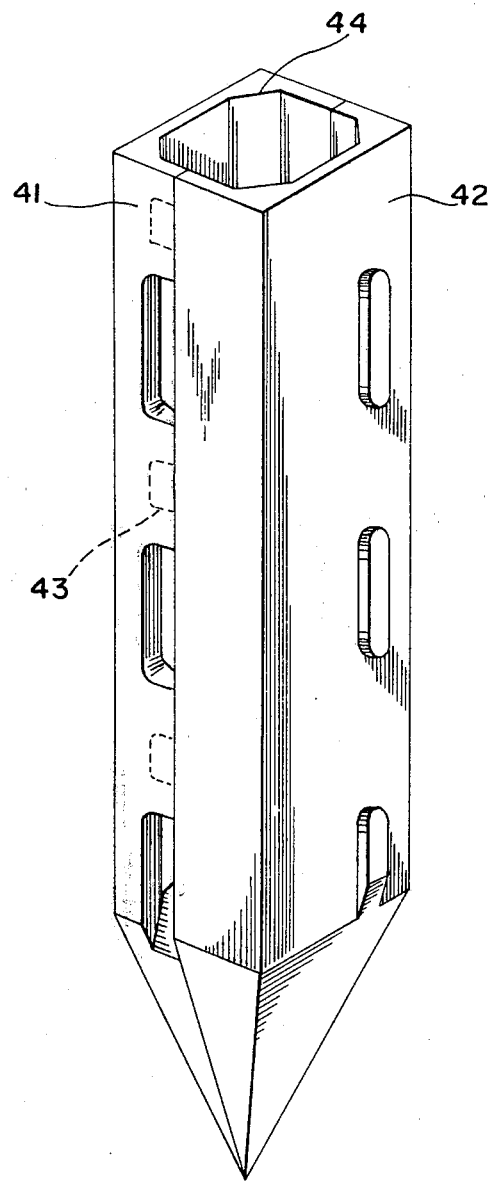
Figure 7:
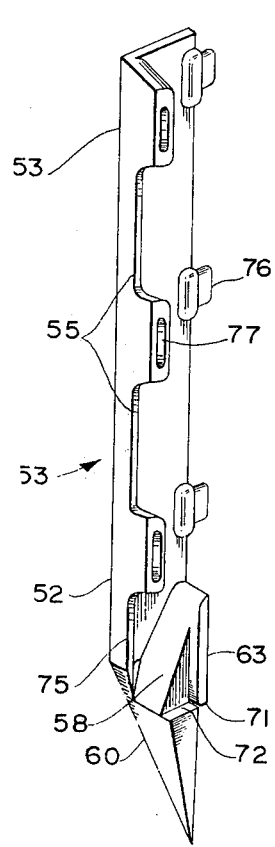
FIG. 7 illustrates one section of the container of FIGS. 5 and 6.

The embodiment of FIG. 4 is formed of two sections 41 and 42 which are connected along two opposite walls by pins 43 attached to one section 42 adapted to be pressed into holes in the other section 41, details of which can be best seen with reference to the embodiment of FIG. 7.

Referring to FIGS. 3 and 4, apertures need not necessarily be included in all walls. Also, it is not necessary that all walls have lugs to provide interlocking when grouped into bundles.

FIG. 3 is partially fragmented to show the bottom of the container cavity 40. The lower part of the nose portion 33 is preferably solid to withstand the forces of insertion into the soil. The upper surface 37 of the nose portion which defines the bottom of the cavity 40 slopes downwardly and outwardly to the bottom of the lowest aperture 38, to allow unimpeded egress of the tap root. Preferably the lower aperture 38, in conjunction with the surface portion 37, forms a channel 39 which extends downward below the wall 35 of the container into the nose portion 33. It will be noted that the lowest part of the aperture 38 and the channel 39 opens downwardly radially inward from the outer surface of the wall 35 thereby allowing drainage of the container and air pruning of the roots during the nursery phase even though surrounded by other containers.

Figure 6:
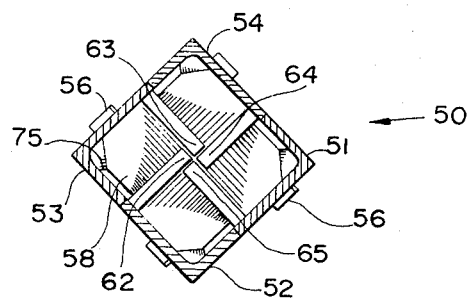
FIG. 6 is a section of FIG. 5 taken at VI — VI.
Figure 5:
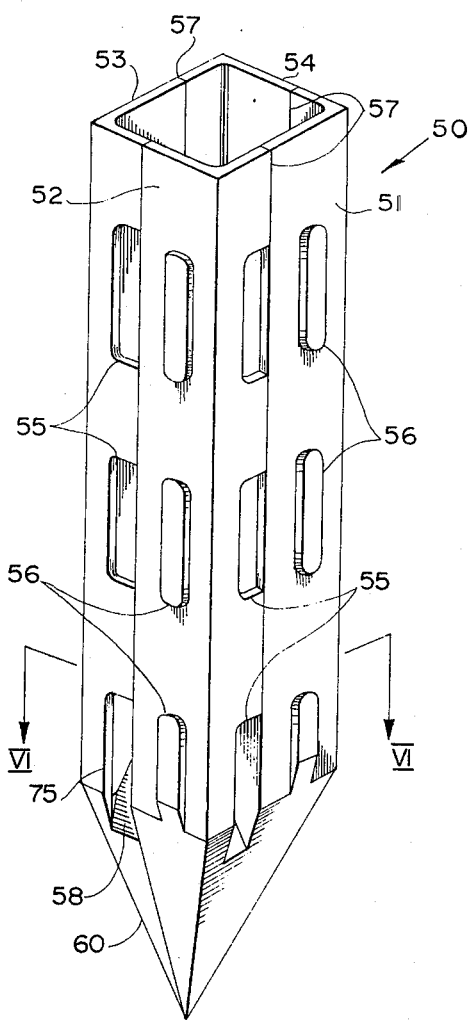

FIG. 5 illustrates an embodiment which comprises four identical separable sections 51, 52, 53 and 54. Each wall of the container 50 has an identical arrangement of offset apertures 55 and lugs 56 arranged to mate with any wall of another identical container. FIG. 6 shows a section of FIG. 5 taken at VI — VI.

FIG. 7 shows one section 53 of the container of FIGS. 5 and 6. Each section has interconnecting pins 76 and pin receiving holes 77 for connecting with two other identical sections.

Figure 8:
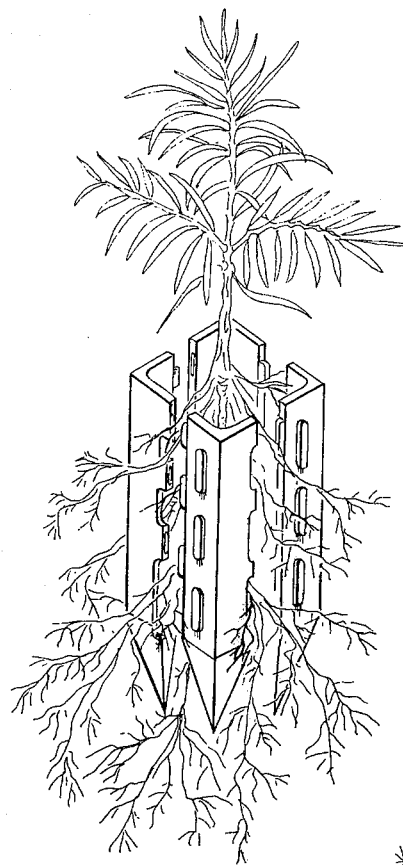
FIG. 8 illustrates the separation of the container of FIG. 4 as caused by the growth of the seedling roots.

The nose portion 60 of each section comprises complementary interlocking elements which prevent relative vertical displacement of the sections and also limits horizontal displacement so that the sections do not separate as the container is inserted into the soil, and yet allows radial separation of the sections as the roots grow and exert forces thereon. Vertical displacement of the sections is prevented by the abutment of the surface 71 onto the surface 72 of an adjoining section. When all four sections are similarly assembled as in FIG. 5, relative vertical displacement, both up and down, is prevented. Also, with reference to FIGS. 6 and 7, the projecting element 63 of section 53 interlocks with corresponding elements 64, 65 and 62 (FIG. 6) of adjacent sections to limit horizontal displacement inward but allows radially outward separation, as shown in FIG. 8.

With further reference to FIGS. 5, 6 and 7, each section of the nose portion, for example section 60, has a surface portion 58 in each section which slopes downwardly and outwardly to the bottom of the lowest aperture 75, to allow unimpeded egress of the tap root.

With reference to FIGS. 5 and 7 it will be noted that the container 50 is divided into sections along lines 57 which intersect the apertures 55 so that the apertures 55 are in the form of notches in order that the roots as they grow are not girdled by the apertures.

It may be desirable that the containers have increased wall thickness at the corners to provide the structural rigidity required to withstand the forces of mechanical planting. In the embodiment of FIG. 1 this object is achieved by having a circular cavity 8. In FIG. 4 an octagonal cavity 44 is illustrated.

Suitable biodegradable materials for the containers, in addition to wood previously mentioned, may include thermoplastics with biodegradable fillers such as starch-filled polystyrene or polyethylene. Another suitable thermoplastic material is epsilon-caprolactone homopolymer having an average molecular weight of approximately 40,000 and which is characterized by interconnected recurring linear units having the formula

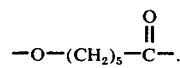

Containers comprising separating sections may be formed of any rigid material, such as polystyrene for example, but may also be formed of a biodegradable material if desired.

In preparing the containers for planting, selected numbers of containers are grouped in the desired number and configuration and a suitable strap or band is applied to form a unified bundle. The bundles are then filled with soil and seeded. The square shape and interlocking arrangement prevents soil from falling between containers which might otherwise allow the roots to grow out through the apertures. The possibility of the tap root growing out from the lower section is minimized by its lowest apertures being disposed some distance above the tip of the nose which rests on the supporting surface. Growth of a root is halted when exposed to air.

It is inevitable that a fraction of the seeds planted will not yield a seedling and therefore a bundle may have one or more containers without a seedling. FIG. 9 illustrates a convenient method of ensuring that each container of a bundle 91 will have a seedling at substantially the same stage of development. At the same time the containers of bundle 91 are seeded, an additional number of relatively small containers 92 are also seeded, which will develop at the same rate. These small containers may be similar to the other containers differing only in size. Prior to planting, any container without a seedling can have inserted into it one of the small containers 92. A mechanical planting device 93 may be used to facilitate insertion of the small containers into the large containers.

The containers remain in bundles to facilitate handling and transporting to the planting site. The strap 94 is then cut to enable individual containers to be planted with a suitable mechanical planting device, for example, one of the general type described in the aforesaid Canadian Pat. No. 694,803 suitably modified to accommodate square sectioned containers.

What is claimed is:

1. A planting container for grouping with a plurality of similar containers into a bundle, said containers comprising:
    a. a tubular portion having a square shaped outer cross-section defining four walls and a cavity;
    b. a plurality of the walls having a plurality of longitudinally spaced apertures, said apertures being offset to one side of the longitudinal center of each wall whereby the apertures are blocked by a wall of another similar container which is placed contiguous thereto; and
    c. an earth penetrating nose portion having at least one surface portion which defines the bottom of said cavity, said surface portion sloping downwardly and outwardly to the lowest of said apertures in a corresponding wall to allow unimpeded tap root egress.

2. The container of claim 1 wherein at least one of the walls has two locating lugs, each lug being offset to the side opposite that of the apertures and adapted to mate with an aperture of another similar container placed contiguous thereto.

3. The container of claim 1 formed of a biodegradable material.

4. The container of claim 2 comprising a plurality of separable sections.

5. The container of claim 1 wherein the cavity is shaped to provide a wall thickness at the corners greater than the wall thickness between the corners.

6. The container of claim 5 wherein the cavity has a generally circular cross-sectional shape.

7. The container of claim 4 wherein the separable sections are interconnected by pin and pin receiving hole means.

8. The container of claim 4 comprising four sections.

9. The container of claim 8 wherein each section is identical.

10. The container of claim 4 having lines of separation which intersect the longitudinally spaced apertures.

11. The container of claim 4 wherein the nose portion of each section comprises complementary abutting elements for preventing one section from being displaced vertically relative to an adjacent section.

12. The container of claim 1 wherein the lowest aperture extends downwardly into the nose portion and whereby the cavity bottom defining surface portion defines a channel which opens downwardly radially inward from the outer surface of the wall.

13. A method of preparing planting containers for the planting of seedlings comprising:
    a. grouping a plurality of containers into a unified bundle and providing another group of containers which are small relative to those in the bundle;
    b. filling all containers with a growing medium;
    c. planting a seed in each of said containers; and
    d. after a period of time at which some of the seeds have developed into seedlings, inserting one of the small containers into each of the containers of the bundle which do not contain a seedling in order that each of the containers of the bundle contains a seedling at substantially the same stage of growth.

* * * * *